US005737305A

United States Patent [19]
Kayukawa

[11] Patent Number: 5,737,305
[45] Date of Patent: Apr. 7, 1998

[54] PLATE MEMBER FOR ATTACHING/ DETACHING DISK FROM DISK CHUCK

[75] Inventor: Yoshiaki Kayukawa, Kanagawa, Japan

[73] Assignee: Sony Corporation, Japan

[21] Appl. No.: 612,405

[22] Filed: Mar. 7, 1996

[30] Foreign Application Priority Data

Mar. 15, 1995 [JP] Japan ................................. 7-052853

[51] Int. Cl.⁶ .......................... G11B 25/04; G11B 17/028
[52] U.S. Cl. .................... 369/271; 369/75.2; 360/99.12
[58] Field of Search ........................ 369/75.2, 270–271; 360/98.08, 99.05, 99.12

[56] References Cited

U.S. PATENT DOCUMENTS

| | | | |
|---|---|---|---|
| 4,400,808 | 8/1983 | Saito et al. ............................. | 369/270 |
| 4,855,990 | 8/1989 | Akiyama ................................ | 369/270 |

Primary Examiner—Craig A. Renner
Assistant Examiner—George J. Letscher
Attorney, Agent, or Firm—Ronald P. Kananen

[57] ABSTRACT

There is provided a disk detaching/attaching unit which reduces a load on a disk and a drive source when detaching or attaching the disk. The disk detaching/attaching unit for a magnet chuck includes a plate member which moves in a disk detaching/attaching direction perpendicular to a rotating plane of the disk and having an edge portion which abuts against the vicinity of the center of the disk magnetically chucked on the magnet chuck, and plate member drive means for moving the plate member between a waiting position where the edge portion of the plate member is situated below the chucked disk and a delivery position where the disk is detached and raised up from the magnet chuck so as to detach the disk from the magnet chuck or attach it thereto.

10 Claims, 8 Drawing Sheets

PLATE MEMBER FOR ATTACHING/DETACHING DISK FROM DISK CHUCK

BACKGROUND OF THE INVENTION

1. Field of the Invention

The present invention relates to a disk detaching/attaching unit, and in particular, to a disk detaching/attaching unit which is provided with a plate member for detaching a disk from a magnet chuck and for attaching it thereto, and abuts the plate member against the vicinity of the center portion of the disk to reduce a load on the disk caused when the disk is detached or attached.

2. Description of the Related Art

In optical disk drive, there has been known a manual type disk drive of manually changing a disk and an automatic type disk drive of automatically changing a disk. In general, the disk drive of automatically changing a disk is called as a changer. A hand of the changer draws out a necessary disk from a box storing a plurality of disks and delivers the disk onto a tray of a disk drive unit, and then, receives the disk from the tray to again store it in the box.

FIG. 8 is a plan view of a disk drive for explaining a disk change in a conventional disk drive; on the other hand, FIG. 9 is a side view of the disk drive unit viewed from an arrow IX of FIG. 8. As shown in FIG. 8, a spindle 72 for driving a disk D is located on the center of a base 71 of the disk drive. The spindle 72 is provided with a magnet chuck 70. Trays 73 for supporting the disk D are arranged on the opposite sides of the spindle 72, and individually have the same construction. As shown in FIG. 9, these respective trays 73 are supported by a shaft 74 set on the base 71, and movable in a disk detaching/attaching direction (up-and-down direction in FIG. 9) vertical to a rotating plane of the disk D. Further, these trays are urged upward by means of compressed springs 75.

Moreover, these trays 73 each abut against a part (cross-hatched portion in FIG. 8) of the outer peripheral edge of the opposing disk D so as to support the disk. When the tray 73 is raised upward, the disk D supported by the tray 73 is positioned above the spindle 72, as shown in the right-hand side of FIG. 9; on the other hand, when the tray 73 is lowered against a spring force of the compressed spring 75, the tray 73 is positioned below the disk D chucked by the spindle 72, as shown in the left-hand side of FIG. 9.

A pressing plate 76 is arranged above the spindle 72 and the tray 73 so as to cover them, and shown in a state of being partly broken in FIG. 8. Further, the pressing plate 76 is supported by side plates (not shown) at its right and left edge portions in FIG. 8, and movable in the disk detaching/attaching direction (up-and-down direction in FIG. 9) by means of a drive source (not shown). Furthermore, the pressing plate 76 is provided with push pins 77 fixed opposing to each tray 73. When the pressing plate 76 is lowered, the push pin 77 abuts against the tray 73, so that the tray 73 is lowered against a spring force of the compressed spring 75.

A changer hand 78 includes a pair of supporting rods 79, and claws 80 which are fixed two by two on each of supporting rods 79 and directed toward the spindle 72, that is, four claws in total. Further, these four claws 80 are designed so that the disk D is placed thereon. The supporting rods 79 advance and retreat to a space between the base 71 and the pressing plate 76 and are movable in the vertical direction by means of a drive source (not shown).

In such a conventional apparatus, a change operation of the disk D with respect to the spindle 72 is carried out as follows. To achieve an attachment of the disk D, the hand 78 advances into a space between the base 71 and the pressing plate 76 in a state that the disk D is placed on claws 80, and delivers the disk between the tray 73 and the pressing plate 76, as shown in FIG. 8. Then, when the hand 78 reaches a predetermined position, it lowers to transfer the disk D onto the tray 73, and thereafter, the hand 78 retreats (see the right-hand side of FIG. 9). Moreover, the pressing plate 76 is lowered by means of a drive source so that the tray 73 is lowered to a descent position by means of the push pin 77, and during this motion, the disk D is transferred onto the spindle 72 (see the left-hand side of FIG. 9). At this time, the disk D is chucked by means of the magnet chuck 70 mounted to the spindle 72, and the attachment of the disk D is accomplished in this manner.

On the other hand, to achieve an detachment of the disk D from the magnet chuck 70, when the pressing plate 76 is raised up, the tray 73 is raised by a spring force of the compressed spring 75, and in this process, the spring force overcomes an attracting force of the magnet chuck 70, so that the tray 73 allows the disk D to detach from the spindle 72. As a result, the tray 73 is in a state as shown in the right-hand side of FIG. 9. And then, conversely to the foregoing attachment, the hand 78 advances to a space between the base 71 and the pressing plate 76 in a state of being lowered, and successively raises up so as to receive the disk D on the tray 73. Thereafter, the hand 78 retreats from the space between the base 71 and the pressing plate 76 in a state that the disk D is placed thereon.

As described above, in the conventional apparatus, a delivery of the disk D is carried out between the hand 78 and the tray 73; for this reason, the tray 73 must support the disk D within a region limited to some degree to avoid interfering with the motion of the hand 78. Specifically, the trays 73 support the edge portions on the opposite sides of the disk D around the spindle 72.

As seen from the side view of FIG. 9, the disk D is partly supported by the trays 73 at its edge portion, and the center of the disk D is situated on the spindle 72. For this reason, when the disk D is delivered from the tray 73 to the spindle 72 and from the spindle 72 to the tray 73, a relatively large bending moment is applied to the disk D due to a load caused by an attracting force of the magnet chuck 70. This bending moment applied to the disk D increases the possibility of causing a disadvantage such as distortion in the disk D.

Moreover, to achieve the detachment of the disk D from the magnet chuck 70 of the spindle 72, a force capable of overcoming a magnet attracting force of the magnet chuck is required. The force is dependent on a spring force of the compressed spring 75 for urging the tray 73; for this reason, the compressed spring 75 requires a spring force greater than a chucking force of the magnet chuck 70. As a result, in order to drive the pressing plate 76 for pushing down the tray 73, a greater force is required against the spring force of the compressed spring 75; therefore, a load applied to a drive source such as motor increases.

OBJECT AND SUMMARY OF THE INVENTION

To solve the above problem, an object of the present invention is to provide a disk detaching/attaching unit which is capable of reducing a load on a disk and a drive source when the disk is detached from a magnet chuck or attached thereto.

In order to achieve the above object, the present invention provides a disk detaching/attaching unit comprising: a tray being movable to a disk detaching/attaching unit in a direction perpendicular to a rotating plane of a disk and supporting said disk;

tray drive means for moving said tray between a tray raise-up position where the disk supported on the tray is situated above said magnet chuck and a tray descent position below the disk chucked on said magnet chuck;

a plate member being movable to said disk detaching/attaching direction and having an edge portion capable of abutting against the vicinity of the center of said disk chucked on said magnet chuck; and plate member drive means for moving said plate member between a waiting position where said edge portion of plate member is situated below the chucked disk and a delivery position where the disk is detached and raised up from said magnet chuck so as to detach the disk from said magnet chuck or attach it thereto, said both drive means driving said plate member and tray so that said plate member and tray make a cooperative motion which moves said plate member to said delivery position during a process of moving said tray supporting the disk from said raise-up position to said descent position, and attaches the disk to said magnet chuck during a process of moving said plate member to said waiting position after the disk is transferred onto said plate member, and which receives the disk on said magnet chuck to said plate member during a process of moving said plate member from said waiting position to said delivery position, and delivers the disk on said plate member to said tray during a process of moving said tray from said descent position to said raise-up position.

DETAILED DESCRIPTION OF THE PREFERRED EMBODIMENT

Figure 1:
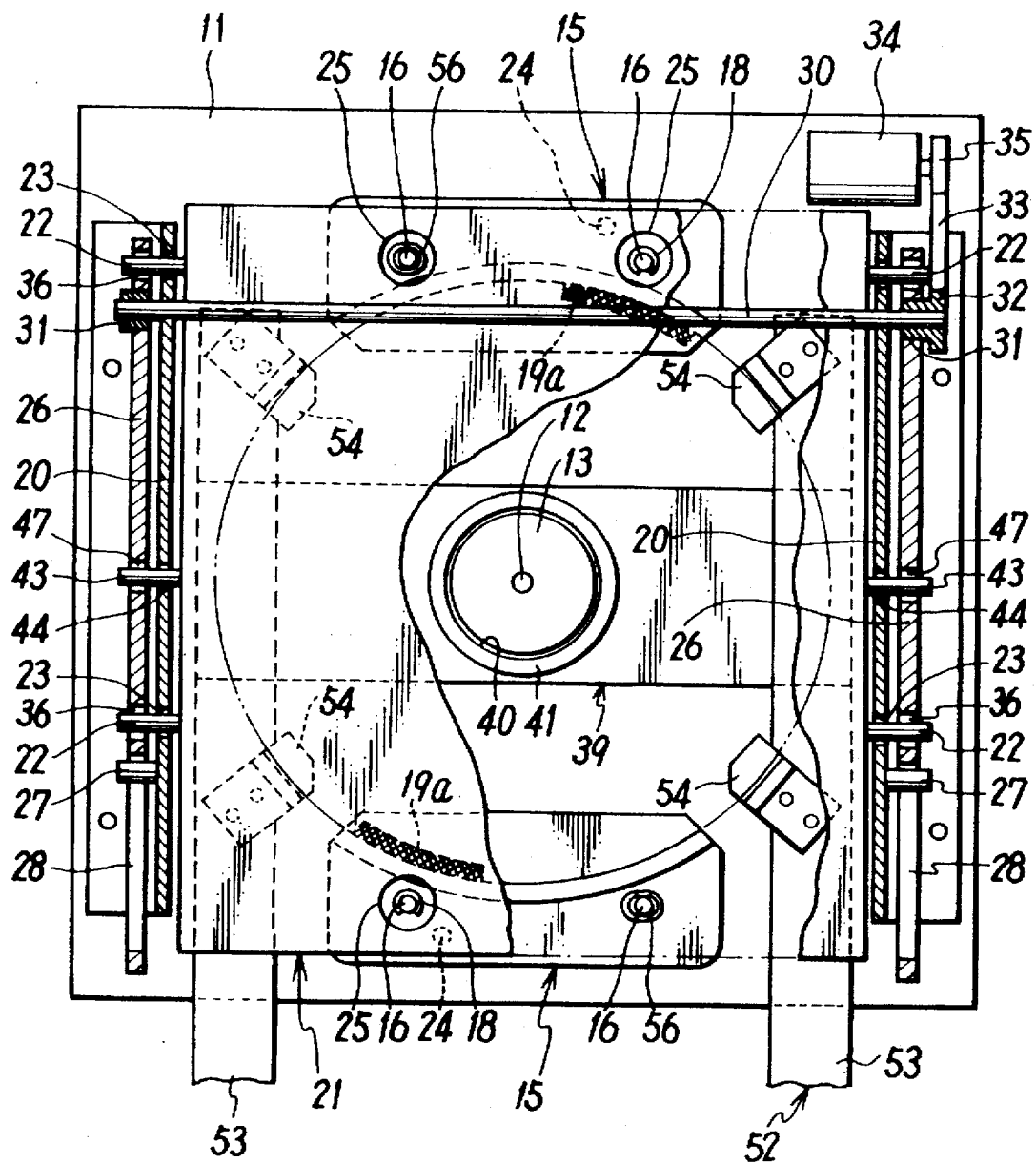
FIG. 1 is a plan view of a disk drive including a disk detaching/attaching unit according to one embodiment of the present invention.

One embodiment of the present invention will be described below in detail with reference to accompanied drawings.

A disk detaching/attaching unit according to the present invention generally includes a changer hand 52, a tray 15 for carrying out a delivery of a disk D, a pressing plate 21 for pushing up the tray 15, a plate member 39 for carrying out a delivery of the disk D between the tray 15 and a spindle 12, a cam plate 26 for raising and lowering the pressing plate 21 and the plate member 39 with a predetermined cooperative relationship (motion), a motor 34 for driving the cam plate 26 and gears.

Figure 2:
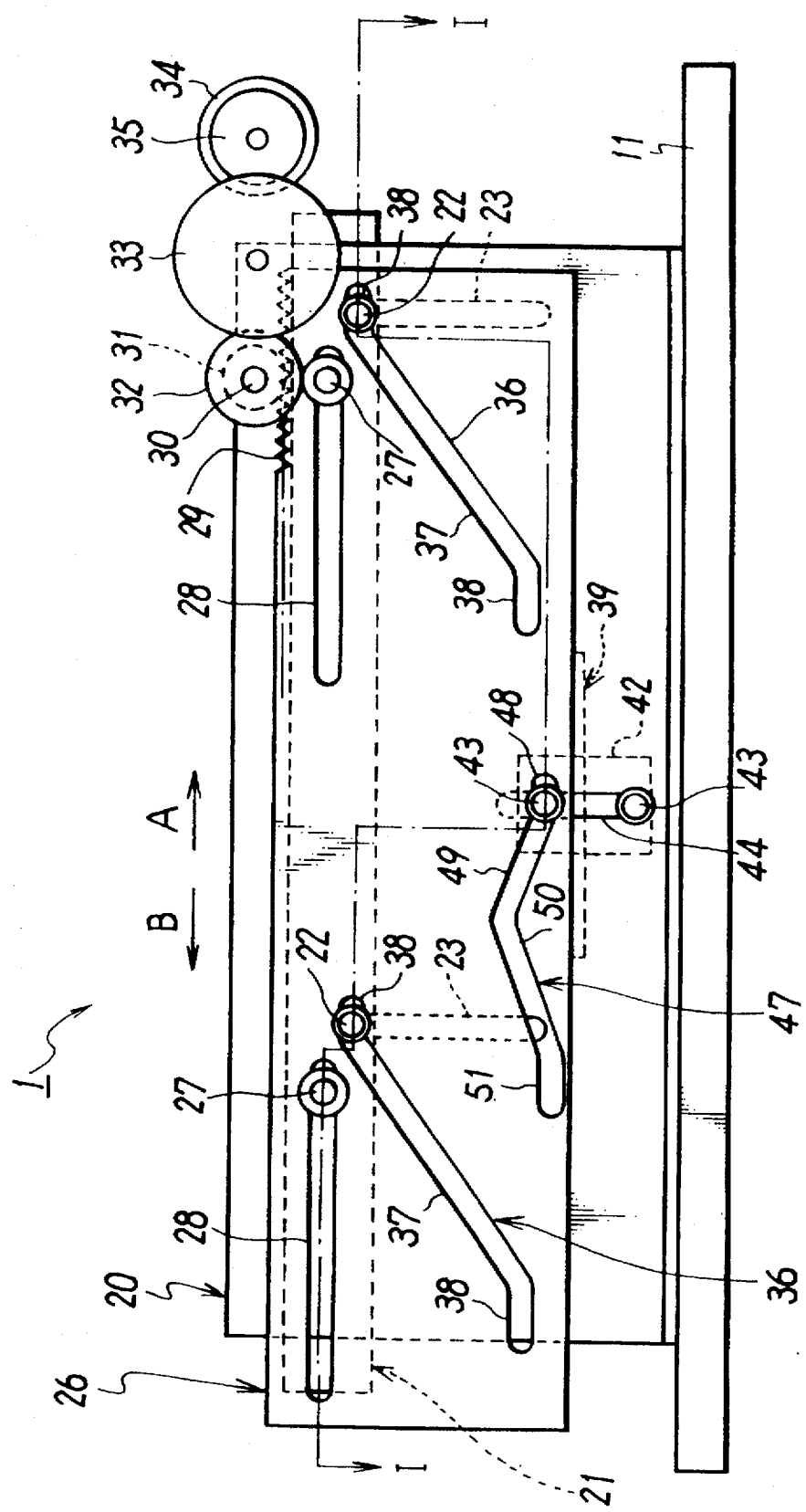
FIG. 2 is a side view of the disk drive shown in FIG. 1.
Figure 3:
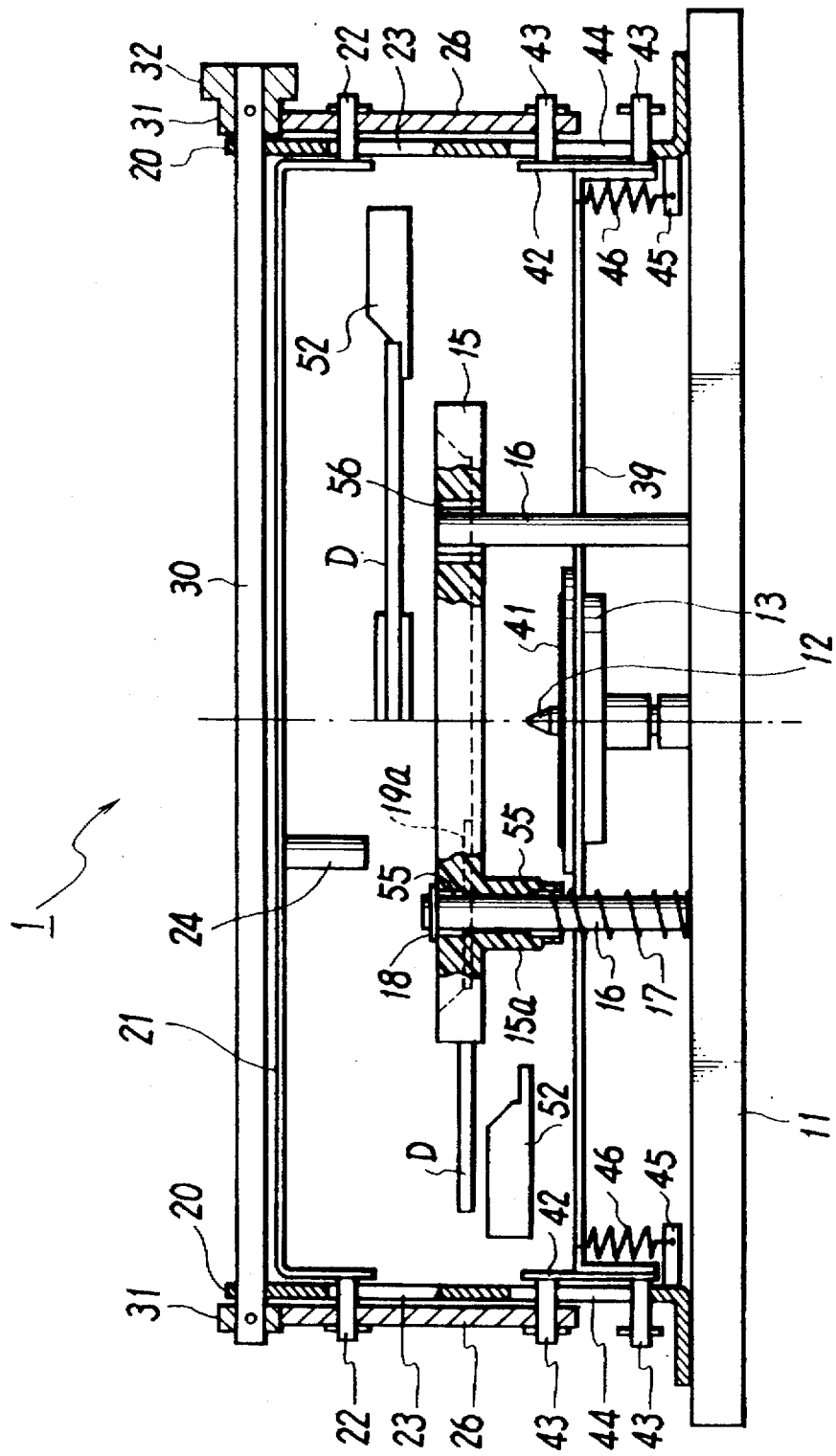
FIG. 3 is a front view of the disk drive shown in FIG. 1.
Figure 4:
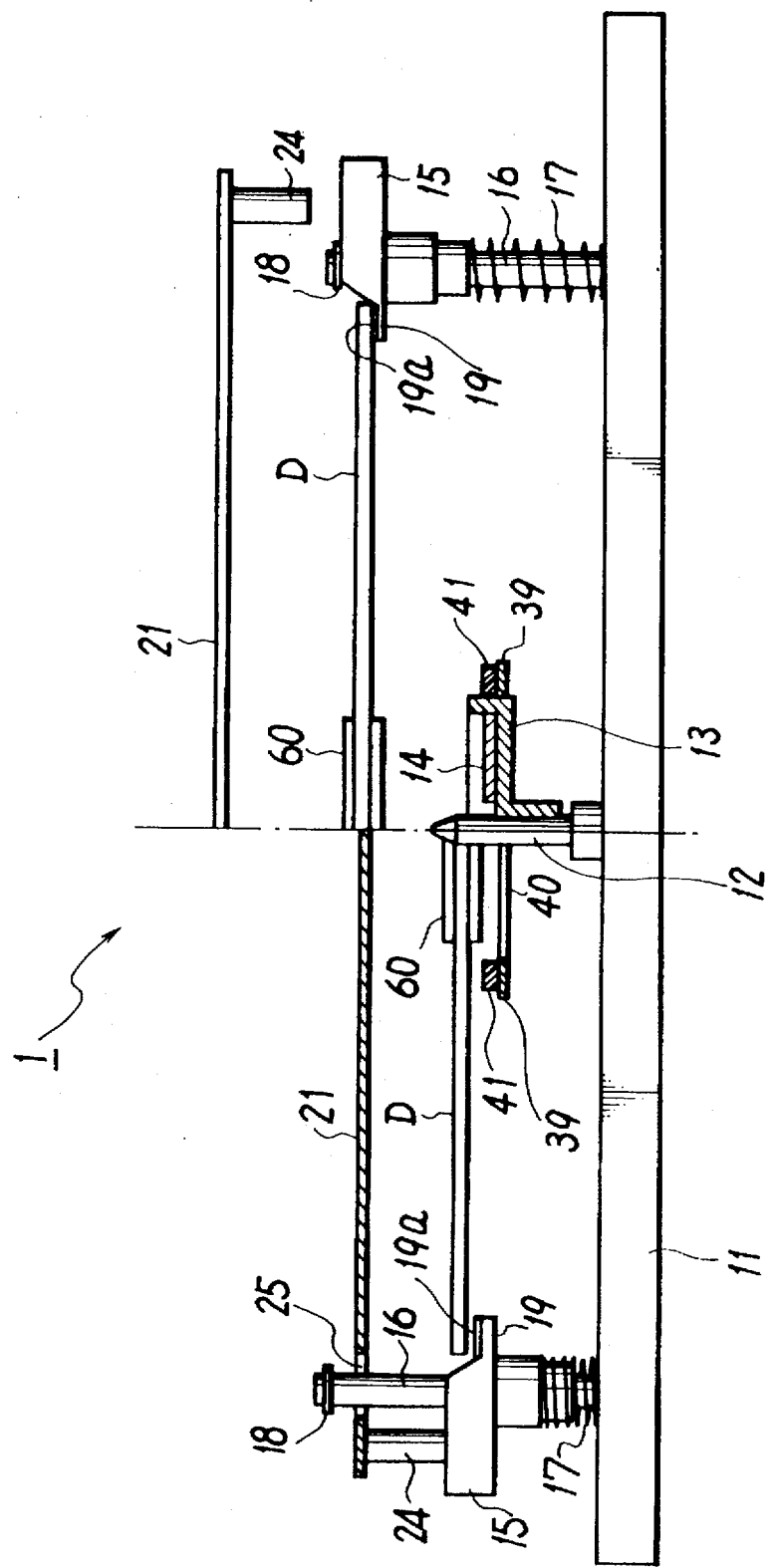
FIG. 4 is a partly omitted side view of the disk drive shown in FIG. 1.
Figure 5:
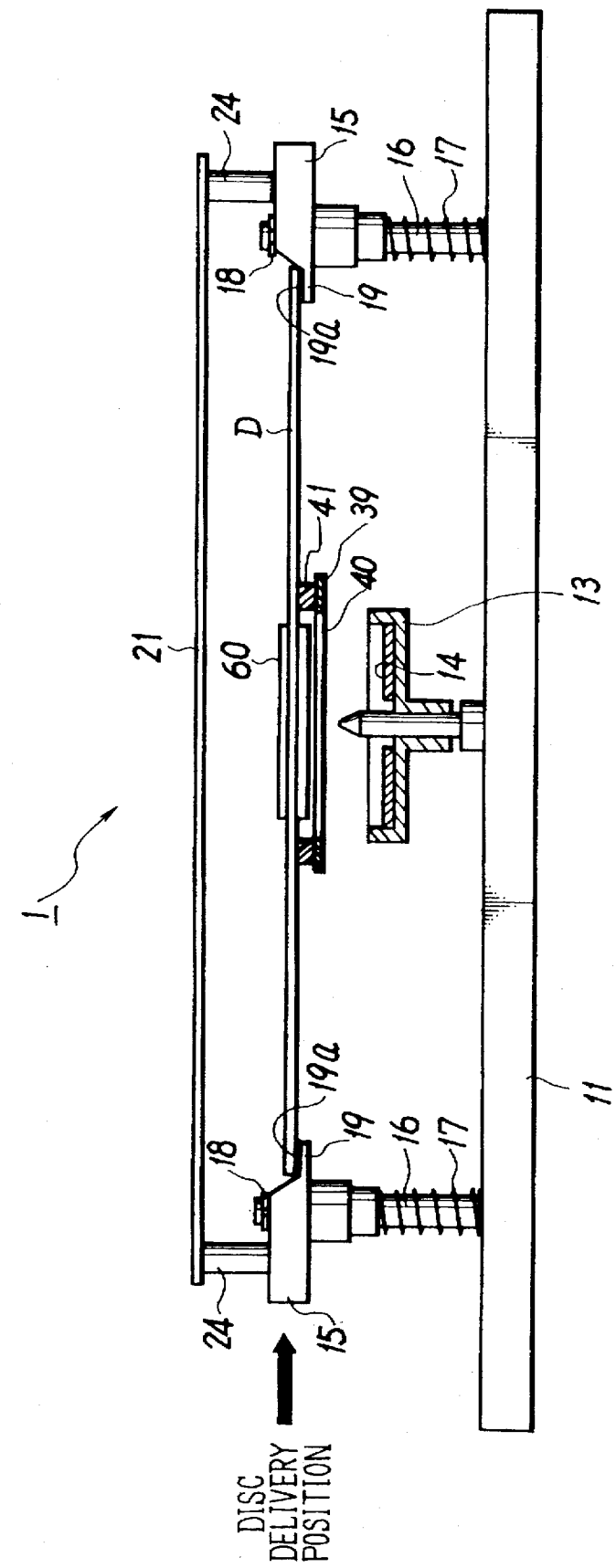
FIG. 5 is a side view schematically showing a state of a disk delivery in the disk drive shown in FIG. 1.

FIG. 1 shows a plan view of a disk drive including a disk detaching/attaching unit according to one embodiment of the present invention, FIG. 2 showing a side view thereof, FIG. 3 showing a front view thereof, FIG. 4 showing a partly omitted side view thereof, and FIG. 5 being a partly omitted side view showing a state of a disk delivery.

A spindle motor is incorporated into a base 11 having a rectangular shape in a plane. As shown in FIG. 1, a spindle 12 connected to the spindle motor projects from the center of the base 11. A magnet chuck 13 is fixed on the upper portion of the spindle 12 in a state of jutting out from the spindle. As shown in FIG. 4, a chucking magnet 14 is fixed in the magnet chuck 13. A chucking portion 60 of a disk D is magnetically chucked on the magnet chuck 13 so that the disk D is attached to the spindle 12.

Trays 15 are individually arranged in the opposite sides (up and down sides in the drawing of FIG. 1) around the spindle 12. These trays 15 individually have the same construction and are slidably supported to each of two shafts 16 set on the base 11, as shown in FIG. 3. Further, these trays 15 are movable in disk detachment and attachment direction (up-and down direction in FIG. 3) vertical to a rotating plane of the disk D attached to the spindle 12.

As seen from FIG. 3, a shaft bearing portion extends along the axial direction of the shaft 16, and projects from a portion of the tray 15 into which the shaft 16 shown in the left-hand side of FIG. 3 is fitted. A pair of bearings 55 are provided in a hole idly formed through the shaft bearing portion 15a so as to be in mesh with the shaft 16. On the other hand, an elliptic-shaped hole (see FIG. 1) extending in the right and left direction is formed in a portion of the tray 15 into which the shaft 16 shown in the right-hand side of FIG. 3 is fitted. A bearing 56 provided in the hole is in mesh with the shaft 16 of the right-hand side. Thus, the trays 15 are supported by the shaft 16 shown in the left-hand side of FIG. 3 so that they are slidable in the substantially vertical direction, while a rotating motion around the left-hand side shaft 16 is controlled by the shaft 16 shown in the right-hand side of FIG. 3.

The trays 15 individually have a first urging means for urging in one of the movement directions. In this embodiment, the trays 15 are urged upward by a compressed spring 17 wound around the shaft 16 shown in the left-hand side of FIG. 3. Also, a raising position of the trays 15 is controlled by an E ring 18 mounted to the shaft 16.

These trays 15 each have a substantially rectangular shape in a plan, as shown in FIG. 1, and are further formed with a stepped portion 18 having a notch shaped into a circular arc at the side where they face each other, as shown in FIG. 4. The stepped portion 19 is formed with a disk support surface 19a (cross-hatched portions in FIG. 1) which supports the disk D by fitting with the outer peripheral edge portion riding on the center of the disk D. When the tray 15 is situated on the raised position, the disk D supported on the tray 15 positions above the magnet chuck 13 of the spindle 12, as shown in the right-hand side of FIG. 4. Moreover, when the tray 15 is moved to the descent position while being lowered against a spring force of the compressed spring 17, the disk support surface 19a of the tray 15 positions below the disk D chucked on the spindle, as shown in the left-hand side of FIG. 4.

As shown in FIG. 1, side plates 20 are individually fixed on the base 11 in a stand-up state on the opposite sides (right and left sides in FIG. 1) of the spindle 12. These side plates are positioned separately from the pair of trays 15 arranged around the spindle 12 and in the direction wherein these trays are rotated at an angle of 90°.

A pressing plate 21 is located between the side plates 20 so as to cover the spindle 12 and the trays 15 as shown in FIG. 1 in a state of being partly broken. The pressing plate 21 has opposite ends formed in a state of being bent below (toward base 11). The bent end portion of the pressing plate 21 is fixed with a pin 22. One side of the pressing plate 21 is provided with two pins 22 as shown in FIG. 3. The side plate 20 is formed with a guide slot 23 vertically extending at a position corresponding to the pin 22. The pin 22 extends to the outside of the side plate 20 through the guide slot 23. The guide slot 23 guides the pin 22; therefore, the pressing plate 21 can be supported on the side plate 20 so as to be movable in the disk detachment/attachment direction (up-and-down direction in FIG. 3).

As shown in FIGS. 1 and 3, the pressing plate 21 is provided with a push pin 24 at a position opposable to each tray 15. Moreover, as shown in FIG. 5, when the pressing plate 21 is lowered, the push pin 24 abuts against the tray 15 to push down the tray 15 against a spring force of the compressed spring 17.

Also, the pressing plate 21 is formed with a through hole 25 at a position corresponding to the aforesaid shaft 16, as shown in FIG. 1. When the pressing plate 21 is lowered, the shaft 16 is idly fitted in the through hole 25, so that the pressing plate and the shaft 16 are prevented from interfering with each other (see the left-hand side of FIG. 4).

As shown in FIG. 1, a cam plate 26 is arranged outside each side plate 20. Incidentally, the cam plate 26 shown in FIG. 1 represents a section cut along the line I—I in FIG. 2. Two pins 27 are mounted to the side plate 20 so as to face the cam plate 26. The cam plate 26 is formed with transversely extending guide slots 28 for guiding the corresponding pins 27. These pins 27 individually extend outside the cam plate 26 through the guide slots 28. The guide slots 28 guide the pins 27; therefore, the cam plate 26 is supported on the side plate 20 so as to be movable in the transverse direction (right and left direction, that is, directions indicated by arrows A and B in FIG. 2) parallel with a rotating plane of the disk.

As shown in FIG. 2, the upper surface of the cam plate 26 is partly formed with a rack 29. A pinion shaft S0 is stretched across the side plate 20 so as to correspond to the rack 29, and pinion gears 31 fixed to the opposite ends of the pinion shaft 30 each engage with the rack 29. One of the pinion gears 31 is formed with a connecting gear 32 which engages with an intermediate gear 33 supported on the side plate 20. The intermediate gear 33 engages with a drive gear 35 of a motor 34 supported on a support base (not shown). Thus, a drive of the motor 34 which is used as a drive source rotates the drive gear 35, intermediate, gear 33, connecting gear 33 and pinion gear 31, so that the pinion gear 31 engages with the rack 29; therefore, the cam plate 26 is movable in and left directions (directions indicated by arrows A and B in FIG. 2).

Moreover, the cam plate 26 is formed with two pressing plate cam slots 36 for fitting two pins 22 of the pressing plate 21 extending through the guide slot 23 of the side plate 20 into these slots, as shown in FIG. 2. Each of these two pressing plate cam slots 36 is formed into the same shape, and has a slant portion inclined to the movement direction of the cam plate 26 and portions 38 formed on the opposite side the slant portion 37 so as to be parallel with the movement direction of the cam plate 26.

Figure 6:
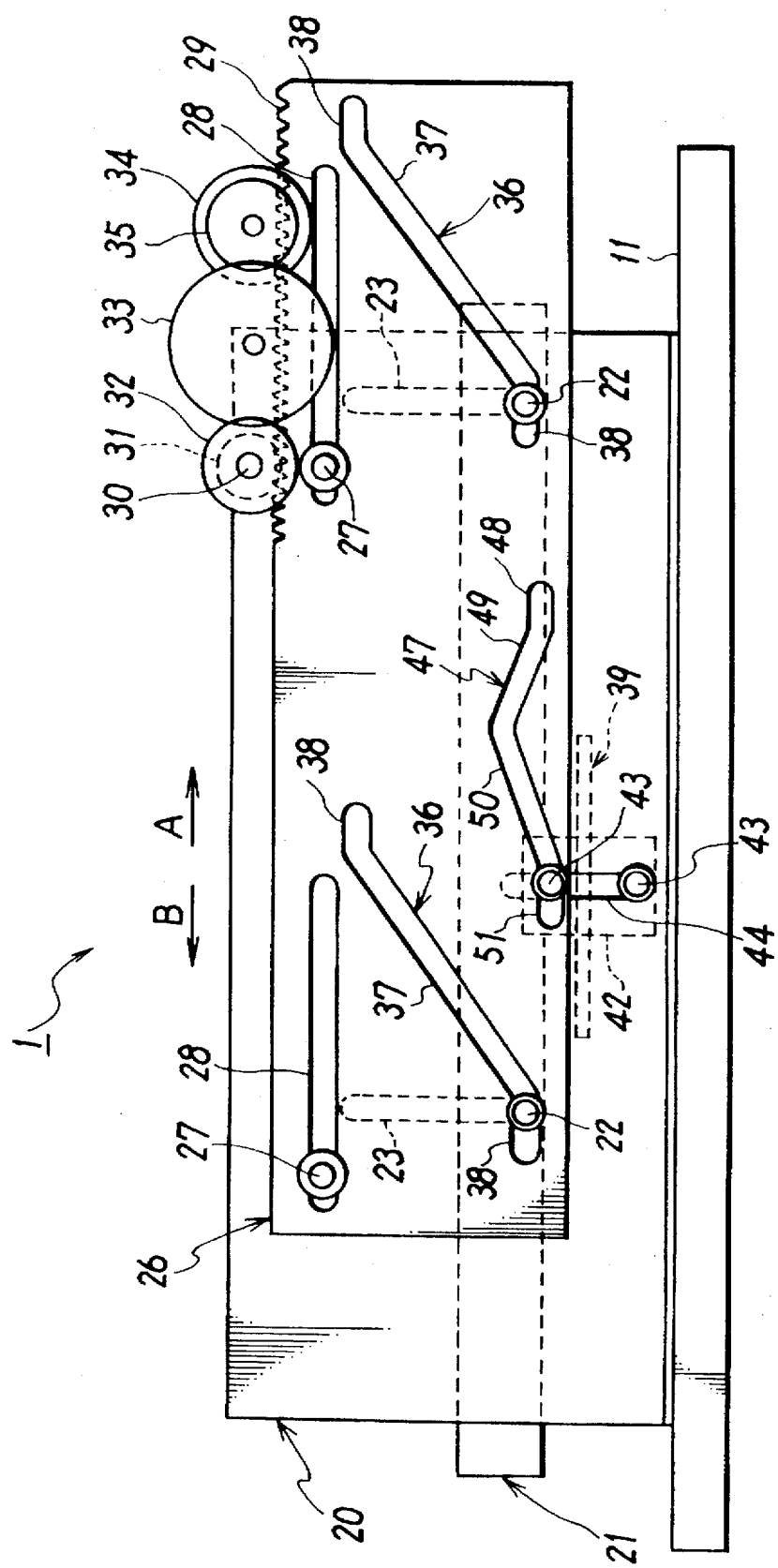
FIG. 6 is a side view showing a state that a disk is attached in the disk drive corresponding to FIG. 2.

Thus, the pins 22 of the pressing plate 21 are individually fitted into the guide slots 23 of the side plate 20 and the pressing plate cam slots 36 of the cam plate so as to control the position of the pressing plate 21. When the cam plate 26 is moved to the right-hand side (direction indicated by the arrow A) as shown in FIG. 6, the pins 22 are guided into the slant portions 37 of the cam slots 36, so that the pressing plate 21 is lowered together with these pins. In the case where the pressing plate 21 is situated on the raise-up position, the push pin 24 does not abut against the tray 15; therefore, the tray 15 is in a state of being raised up. Then, when the pressing plate 21 is moved to the descent position as shown in FIG. 6, the push pin 24 mounted to the pressing plate moves the tray 15 to the descent position against a spring force of the compressed spring 17 (see the left-hand side of FIG. 4). As described above, the motor used as a drive source, gears 35, 33, 32 and 31, rack 29, cam plate 26 and pressing plate 21 constitute tray driving means.

As shown in FIG. 1, a plate 39 which is a member for detaching or attaching a disk is located between the side plates 20 below the pressing plate 21. The plate 39 is a plate-like member having a width narrower than the pressing plate 21, and is formed with an opening 40 at the center portion thereof. The opening has a diameter slightly larger than the magnet chuck 13 of the spindle 12 so that the magnet chuck passes therethrough. Further, a ring-shaped fitting portion 41 is fixed on the plate 39 along the outer periphery edge of the opening 40. For instance, the plate 39 is made of metal; on the contrary, the fitting portion 41 is made of relatively low hardness material such as a synthetic resin and a hard rubber. This serves to prevent the disk plane from being damaged when the disk D is detached and attached. Also, instead of forming the fitting portion 41 made of the material as described in this embodiment, the fitting portion may be formed integrally with the plate 39 when the plate-shaped member is molded.

As shown in FIG. 3, the plate 39 has opposite end portions formed in a state of being bent below (toward base 11 side) so that a support plate 42 is fixed to each of the bent edge portions. Two pins 43 are fixed to the respective support plate 42 separately in the vertical direction. The side plates 20 are individually formed with a longitudinal guide slot 44. These pins 43 extend outside the side plate 20 through the slot. The guide slots 44 guide these pins 43, so that the plate 39 is supported with respect to the side plate 20 so as to be movable in the detachment/attachment direction (up-and-down direction in FIG. 2). In this case, the plate 39 and the foregoing tray 15 each have a shape and a positional relationship such that the plate and the tray do not interfere with each other when they are moved.

There is provided a second urging means for urging the plate 39 to one of movement directions. The second urging means applies an urging force to a direction offsetting the urging force of the first urging force to the foregoing tray 15. Specifically, according to the present embodiment, as shown in FIG. 3, a support pin 45 is fixed to each of side plates 20, and an extension spring 46 is stretched between the support pin 45 and the plate 39. The plate 39 is always urged so as to be moved downward by a spring force of the extension spring 46.

As shown in FIG. 2, the cam plate 26 is formed with a cam slot 47 into which one of pins 43 fixed to the plate 39 through the guide slot 44 is fitted, in addition to the foregoing pressing plate cam slot 36. The cam slot 47 comprises a first horizontal portion 48 parallel with the movement direction of the cam plate 26, increasing and decreasing slant portions 49 and 50 inclined to the movement direction of the cam plate 26, and a second horizontal portion 51 positioning below the first horizontal portion 48, all of which are connected. The decreasing slant portion 50 has a gradient gentler than the slant portion 37 of the cam slot 36.

Thus, the pin 43 of the plate 39 is positioned by the guide slot 44 of the side plate 20 and the cam slot 47 of the cam plate 26. When the cam plate 26 is moved to the right hand (toward the direction indicated by the arrow A) as shown in FIG. 6, the pin 43 is first guided to the increasing slant portion 49 of the cam slot 47 while being once raised together with the plate 39, and successively guided to the decreasing slant portion 50. Finally, the pin 43 is stopped at the second horizontal portion 51 slightly lower than the initial position of the pin 43. In the case where the pin 43 is situated in the first and second horizontal portions 48 and 51, the plate 39 is situated on a waiting position below the disk D. And then, the plate 39 is guided by the decreasing slant portion 49 and raised up from the waiting position while the magnet chuck 13 of the spindle 12 passes through the fitting portion 41 of the plate 39. Thus, the plate 39 is moved to a disk delivery position above the magnet chuck 13 as shown in FIG. 5 against the extension spring 46.

When the pin 43 is situated in the first horizontal portion 48 as shown in FIG. 2, the disk D is not attached to the spindle 12. Therefore, if the plate 39 is positioned to a height such that the plate does not interfere with a hand 52 which will be described later when being guided in the first horizontal portion 48, there is no need of always lowering the plate 39 to the waiting position below the disk D.

As described above, the motor 34 used as a drive source, gears 35, 33, 32 and 31, rack 29 and cam plate 26 constitute plate drive means. The plate drive means use many members including the motor 34 in common with the foregoing tray drive means; therefore, the tray 15 and the plate 39 are driven by the substantially identical drive system. Moreover, a motion of these tray 15 and plate 39 is controlled by one cam plate 26, so that their cooperative motion can be readily obtained as compared with a case where these members are independently driven.

As shown in FIG. 1, a changer hand 52 advances and retreats a space between the base 11 and the pressing plate 21. The changer hand advances and retreats to directions parallel with the arrangement direction of the trays 15 and perpendicular to the extending direction of the plate 39. Further, the changer hand 52 has a positional relationship such that the hand does not interfere with the trays 15 and the plate 39.

The changer hand 52 comprises a pair of support rods 53 and claws 54 which are mounted toward the spindle 12 by two by two onto each support rod 53, that is, four claws in total. These four claws 54 are capable of placing the disk D thereon. The support rods 53 are driven by means of a changer drive unit (not shown) so that they can advance or retreat to a space between the base 11 and the pressing plate 21 and are vertically movable in the space therebetween. Thus, the disk D is advanced or retreated to the space between the base 11 and the pressing plate 21 by means of the hand 52.

Although no illustration is shown, a head is located adjacent to the disk drive to record and reproduce an electric signal with respect to a rotating disk D.

In the construction as described above, the disk D is attached to the magnet chuck 13 of the spindle as follows. First, the changer hand 52 advances to the space between the base 11 and the pressing plate 21 in a state that the disk D is placed thereon, as shown in the right-hand side of FIG. 3, and interposes the disk D between the tray 15 and the push pin 24 of the pressing plate 21. Then, the hand 52 lowers after reaching a predetermined position, and the disk is delivered on the tray 15 during the lowering process (see the left-hand side of FIG. 3). Thereafter, the hand 52 retreats from the space between the base 11 and the pressing plate 21.

Next, when the cam plate 26 transfers from the state shown in FIG. 2 (before the disk being attached) to the state shown in FIG. 6 (after the disk being attached), namely is moved to the direction indicated by the arrow A by the drive of motor 34, the pressing plate 21 moves downward. Then, the push pin 24 of the pressing plate abuts against the tray 15, and thereafter, the pressing plate 21 lowers while pushing down the tray 15.

At this time, in accordance with the movement of the cam plate, the plate 39 is once moved from a waiting position as shown below in FIG. 3 (position of no interference with the motion of the changer hand 52) to a disk delivery position above the spindle 12 as shown in FIG. 5. Successively, the plate 39 is lowered. In this case, a descending speed of the plate 39 with respect to the movement speed of the cam plate 26 is later than that of the pressing plate 21, so that the disk D is delivered onto the fitting portion 41 of the plate 39 from the tray 15. Further, during the descending process of the plate 39, the disk D reaches the magnet chuck 13 of the spindle 12, and is magnetically chucked on the magnet chuck.

After the disk D on the plate 39 is magnetically chucked on the spindle 12, the plate 39 further lowers, and stops at a state as shown in the left-hand side of FIG. 4. The tray 15 and the plate 39 are separated from the disk D in the state as described above, and the attachment of the disk D with respect to the spindle 12 is completed. At this time, the pin 43 of the plate 39 is in a state of being fitted into the second horizontal portion 51 of the cam slot 47 as shown in FIG. 6. Thus, the plate 39 is situated below the initial state shown in FIG. 2; therefore, the plate 39 a does not hinder a rotating motion of the disk D.

In the case where the disk D is detached from the magnet chuck 13 of the spindle 12, the motor 34 is driven in the direction reverse to the foregoing direction to move the cam plate 26 from the state shown in FIG. 6 to the state shown in FIG. 2, namely to the direction indicated by the arrow B. By doing this, the plate 39 is moved upward while its fitting portion 41 abutting against the disk D during movement process, so that the urging force of the plate 39 overcomes an absorptive force of the magnet chuck 13. Thus, the disk D is detached from the spindle 12, and further, the plate 39 is raised up to a disk delivery position shown in FIG. 5 together with the disk. Thereafter, the disk D is delivered onto the tray 15 during the raise-up process of the tray 15, and the tray 15 reaches a predetermined raise-up position; on the other hand, the plate 39 is lowered to a waiting position.

Then, the changer hand 52 advances to a space between the base 11 and the pressing plate 21 in a descent state (shown in the left-hand side of FIG. 3), and is raised up to receive the disk D from the tray 15 (see the right-hand side of FIG. 3). Thereafter, the hand 52 retreats from the space between the base 11 and the pressing plate 21 in a state of placing the disk D, and the disk D is expelled from the drive through a space between the tray 15 and the push pin 24 of the pressing plate 21.

As described above, the disk D is detached or attached with respect to the spindle 12 by using the plate 39, and the plate 39 and the tray 15 are driven by the common cam plate 26. Thus, the plate 59 and the tray 15 are driven in cooperation with each other by means of one drive system, so that the disk D can be smoothly detached or attached.

Moreover, in order to detach the dick from the magnet chuck 13 or attach it thereto, the plate 39 abuts against the portion of the vicinity of the center of the disk D, that is, the portion adjacent to the magnet chuck 13 through the fitting portion 41 thereof. Thus, a position on the disk where a load by an absorptive force of the magnet chuck 13 is applied is near by a position of the plate 39 supporting the disk D when the disk is detached or attached. This serves to extremely make small a bending moment applied to the disk due to the load.

In a conventional disk drive, the disk D is detached or attached by mean of a tray; on the contrary, in this embodiment, the disk D is not detached or attached by mean of the tray 15. Specifically, the tray 15 temporarily supporting the disk D, and by doing this, the tray 15 sufficiently performs a function of itself. Therefore, the tray 15 is considerably downsized in a shape. This serves to efficiently utilize an interior space of the disk drive.

Figure 7:
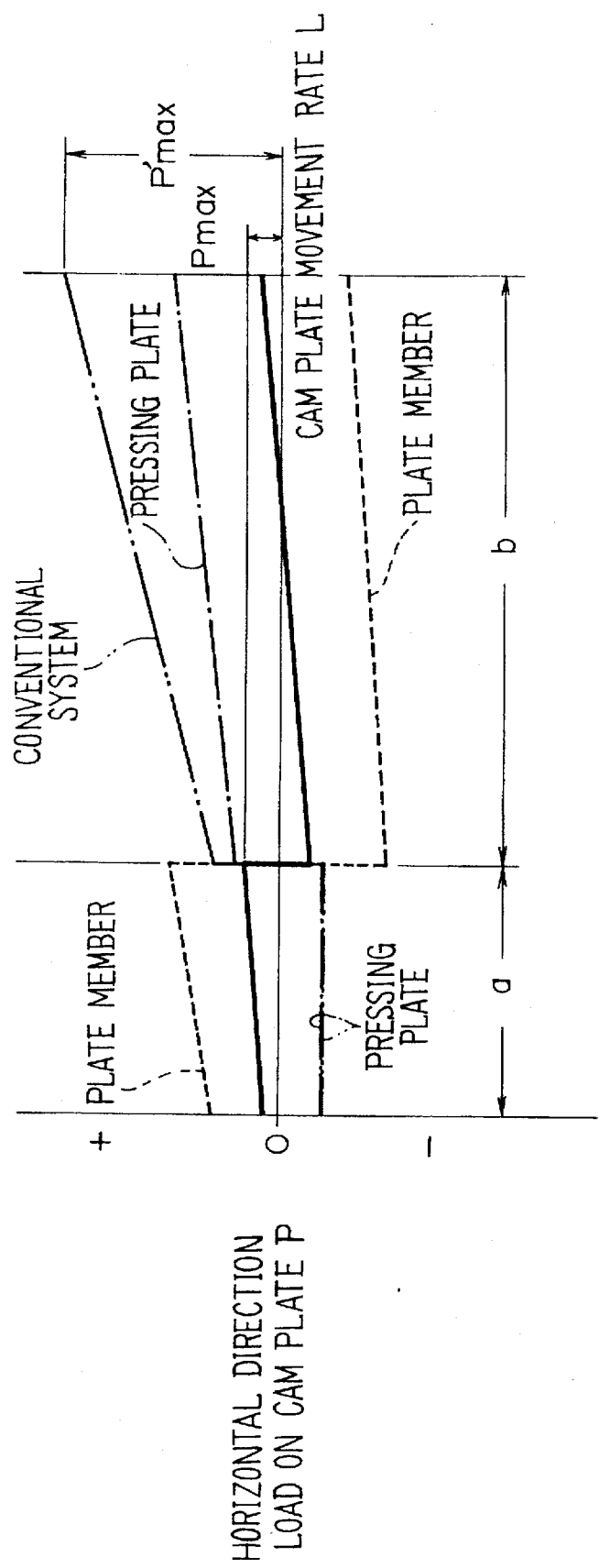
FIG. 7 is a diagram showing a relationship between a movement rate of a cam plate and a lead thereon.
Figure 8:
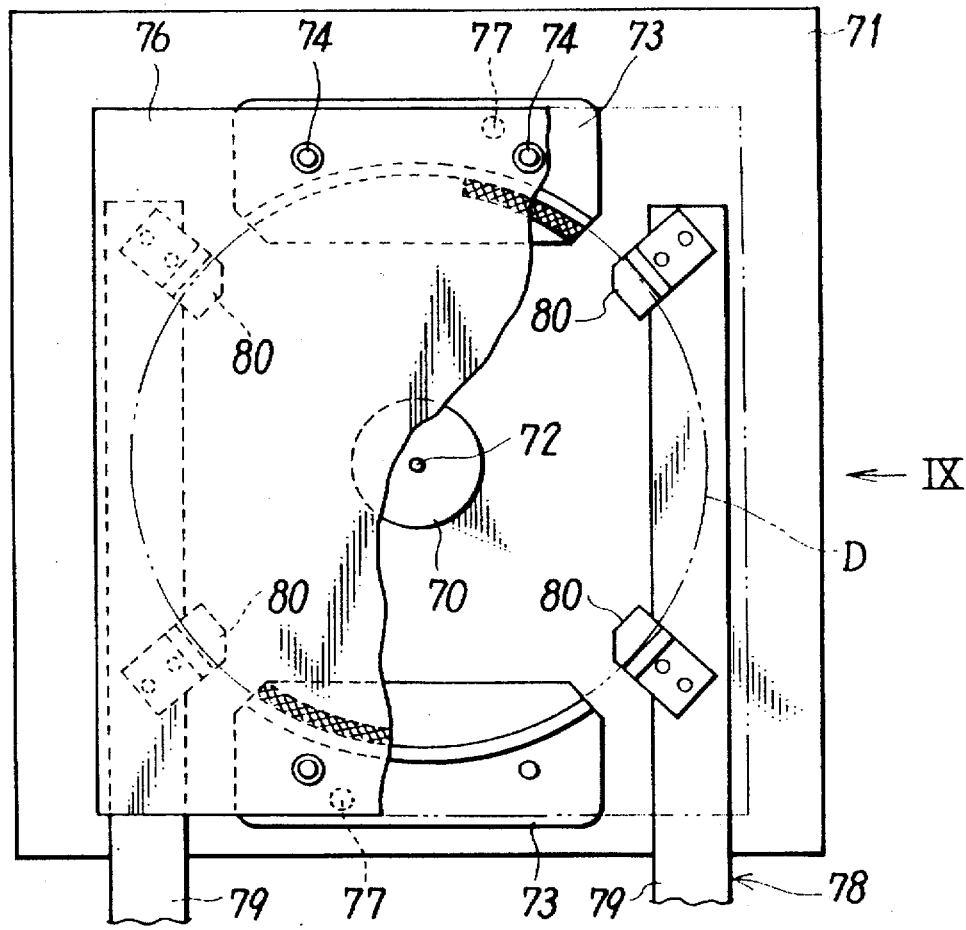
FIG. 8 is a plan view of a conventional disk drive for explaining a disk change.
Figure 9:
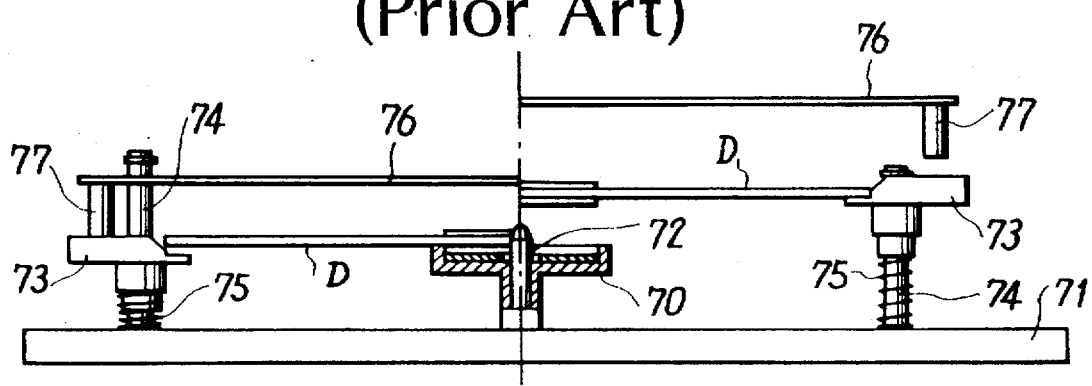
FIG. 9 is a side view of FIG. 8 viewed from the direction of an arrow IX.

FIG. 7 shows a relationship between a movement rate of the cam plate 26 and a horizontal direction (reciprocating direction of the cam plate 26) load caused by the pressing plate 26 and the plate member 39 in the present embodiment. In FIG. 7, an ordinate axis takes a horizontal direction load P on the cam plate 26, and the direction indicated by the arrow A shown in FIG. 2 is a negative (−) load; on the other hand, the direction indicated by the arrow B shown in FIG. 2 is a positive (+) load. An abscissa axis takes a movement rate L of the cam plate 26. In a diagram of FIG. 7, an interval "a" is indicative of a load on each member caused when the tray is raising up until the push pin 24 of the pressing plate 21 abuts against the tray 15 while the plate 39 raising up; on the other hand, an interval "b" is indicative of a load on each member produced when the tray 15 is lowered by abutting the push pin 24 of the pressing plate 21 against the tray 15 while the plate 39 lowering.

As shown in FIG. 7, in the interval "a", only self-weight of the pressing plate 21 is applied to itself, and the self-weight of the plate 21 is applied to the cam plate 26 as the direction A, that is, a negative (−) load. The plate 39 is always urged downward by means of the extension spring 46, and the spring force of extension spring increases for a short time in response to the raise-up of the plate 39. Thus, the spring force is applied to the cam plate 26 as the direction B, that is, a positive (+) load.

In the interval "b", the tray 15 is always urged upward by means of the spring force of the compressed spring 17, and the spring force increases for a short time in response to the descent of the pressing plate 21. Thus, the spring force is applied to the cam plate 26 as the direction B, that is, a positive (+) load. Meanwhile, the plate 39 is always urged downward by means of the extension spring 46, and the spring force decreases for a short time in response to the descent of the plate 39. However, in the interval "b", the inclining direction of the slant portion of the cam slot 47 becomes reverse, so that the spring force is applied to the cam plate 26 as the direction A, that is, a negative (−) load.

As described above, the spring force of the compressed spring 17 and the extension spring 46 is applied to the direction reverse to each other so as to be offset. A bold line in FIG. 7 is indicative of the total of these loads. As is evident from the bold line, the maximum value Pmax of a load on the cam plate 26 according to this embodiment becomes very small as compared with the maximum value P'max of a load on the cam plate 26 according to the conventional system. Accordingly, a load on the motor 34 used as a drive source for the cam plate 26 can be reduced.

Moreover, in this embodiment, the plate 39 is formed with a circular opening 40 having a diameter capable of allowing the magnet chuck 15 to pass therethrough. The edge portion of the circular opening 40 is provided with a ring-like fitting portion abutting against the disk D. Thus, the disk D is supported at the portion nearest to the center thereof and is endlessly supported on the circumference of the fitting portion. Accordingly, this serves to stably detach the disk D from the magnet chuck 13 or attach it thereto. In the present invention, a member for detaching or attaching the disk is not limited to the above embodiment. For instance, instead of supporting the center of the disk D by the entire circumference of the fitting portion, the disk D may be supported on two portions or more around the center of the disk.

Also, the above embodiment describes that the spindle shaft is vertically directed and the disk is vertically detached or attached to the spindle. In the present invention, the direction of detaching or attaching the disk is limited to the foregoing direction, but may be arbitrarily selected in accordance with the construction of the drive apparatus. For illustrative sake, the present invention describes a direction on which the disk is close to the magnet chuck as the downward direction and describes a direction on which the disk is far from the magnet chuck as the upward direction, in the direction of detaching the disk from the magnet chuck or attaching it thereto. Also, in the case where the disk is horizontally detached or attached, if the disk is not stably supported when merely placing the disk on the hand or the tray, the hand and the tray are provided with a proper disk support means such as an operation claw.

The above embodiment is an example of a series of operations for delivering the disk from the changer hand 52 to the magnet chuck 13 through the tray 15 and the plate 39. Various modifications of the operation is allowable in a scope of claims of the present invention.

In this embodiment, the cam plate 26 is formed with two kinds of cam slots, namely the cam slot 36 for the pressing plate and the cam slot 47 for the plate 39, and the pressing plate 21 and the plate 39 are driven by one motor 34 in cooperation with each other. For instance, there is another cam slot other than the above cam slots, and these plates 21 and 39 may be driven in synchronously with other parts by using another slot. Moreover, in this embodiment, the side plate 20 is formed with guide slots 23 and 44 vertically extending. As the case may be, these slots are formed so as to be extended not only in the vertical direction but also in the transverse direction, and the disk may be delivered while being moved in the transverse direction.

The present invention is preferably applicable to a disk-like recording medium such as an optical disk. In the present invention, the disk to be applicable is not limited to the disk as described above. The present invention is widely applicable to detach or attach a disk-like recording medium magnetically chucked.

As described above in detail, according to one embodiment of the present invention, when the disk is detach ed from the magnet chuck or attached thereto, the detachment and attachment of the disk are performed by a plate member supporting the vicinity of the center of the disk. Therefore, a load on the disk by an absorptive force of the magnet chuck can be reduced. The reduction in a load serves to prevent hinderance such as a distortion from being caused in the disk.

Moreover, in the present invention, there is provided a plate member for detaching or attaching the disk separately from the tray for supporting the disk to a predetermined position. Thus, the tray is freed from a delivery of the disk from the magnet chuck causing a load by an absorptive force of the magnet chuck, so that the tray can be downsized in a shape. This serves to efficiently utilize an interior space of a disk drive.

In the present invention, there is provided a drive source used in common with plate member drive means and tray drive means, so that both drive means can be readily cooperated with each other. Also, the urging force of the first urging means for urging the tray and the second urging means for urging the plate member is applied to a direction of offsetting each other, so that a load on the drive source can be reduced. Thus, the entirety of the disk drive can be downsized.

What is claimed is:

1. A disk detaching/attaching unit for detaching a disk-like recording medium from a magnet chuck for rotatably supporting the disk-like recording medium and attaching it thereto, said unit comprising:

a tray movable to a disk detaching/attaching direction perpendicular to a rotating plane of a disk and supporting said disk;

tray drive means for moving said tray between a tray raised-up position where the disk supported on the tray is situated above said magnet chuck and a tray descent position below the disk chucked on said magnet chuck;

a plate member movable to said disk detaching/attaching direction and having an edge portion capable of abutting against the vicinity of the center of said disk chucked on said magnet chuck;

plate member drive means for moving said plate member between a waiting position where said edge portion of plate member is situated below the chucked disk and a delivery position where the disk is detached and raised up from said magnet chuck so as to detach the disk from said magnet chuck or attach it thereto, both of said drive means driving said plate member and tray so that said plate member and tray make a cooperative motion which moves said plate member to said delivery position during a process of moving said tray supporting the disk from said raised-up position to said descent position, and attaches the disk to said magnet chuck during a process of moving said plate member to said waiting position after the disk is transferred onto said plate member, and which receives the disk on said magnet chuck to said plate member during a process of moving said plate member from said waiting position to said delivery position, and delivers the disk on said plate member to said tray during a process of moving said tray from said descent position to said raised-up position; and wherein said plate member has an opening allowing said magnet chuck to pass therethrough and a ring-shaped fitting portion formed on a circumferential edge of said opening, and is movable in said detaching/attaching direction in a state that said magnet chuck positions in said opening, said fitting portion abutting against a circumferential portion of the vicinity of the center of said disk.

2. The disk detaching/attaching unit according to claim 1, wherein said plate member drive means and said tray drive means use a common drive source.

3. The disk detaching/attaching unit according to claim 2, wherein said unit further includes a first urging means for urging said tray in a first movement direction and a second urging means for urging said plate member in a second movement direction, said first and second urging means each applying an urging force in a direction which mutually offsets each other.

4. The disk detaching/attaching unit according to claim 3, wherein said common drive source drives a cam plate so as to achieve a cooperative motion of said plate member and said tray.

5. The disk detaching/attaching unit according to claim 1, wherein a changer hand delivers said disk onto said tray.

6. A disk detaching/attaching unit for detaching a disk-like recording medium from a magnet chuck for rotatably supporting the disk-like recording medium and attaching it thereto, said unit comprising:

a tray movable in a disk detaching/attaching direction perpendicular to a rotating plane of a disk and supporting said disk;

tray drive means for moving said tray between a tray raised-up position where the disk supported on the tray is situated above said magnet chuck and a tray descent position below the disk chucked on said magnet chuck;

a plate member being movable in said disk detaching/attaching directions and having an edge portion capable of abutting against the vicinity of the center of said disk chucked on said magnet chuck; and plate member drive means for moving said plate member between a waiting position where said edge portion of plate member is situated below the chucked disk and a delivery position where the disk is detached and raised up from said magnet chuck so as to detach the disk from said magnet chuck or attach it thereto, both of said drive means driving said plate member and tray so that said plate member and tray make a cooperative motion which moves said plate member to said delivery position during a process of moving said tray supporting the disk from said raise-up position to said descent position, and attaches the disk to said magnet chuck during a process of moving said plate member to said waiting position after the disk is transferred onto said plate member, and which receives the disk on said magnet chuck to said plate member during a process of moving said plate member from said waiting position to said delivery position, and delivers the disk on said plate member to said tray during a process of moving said tray from said descent position to said raise-up position, wherein said plate member has an opening allowing said magnet chuck to pass therethrough and a ring-shaped fitting portion formed on a circumferential edge of said opening, and is movable in said detaching/attaching direction in a state that said magnet chuck positions in said opening, said fitting portion abutting against a circumferential portion of the vicinity of the center of said disk.

7. The disk detaching/attaching unit according to claim 6, wherein said plate member drive means and said tray drive means use a common drive source.

8. The disk detaching/attaching unit according to claim 7, wherein said common drive source drives a cam plate so as to achieve a cooperative motion of said plate member and said tray.

9. The disk detaching/attaching unit according to claim 6, wherein said unit further includes a first urging means for urging said tray in a first movement direction and a second urging means for urging said plate member in a second movement direction, said first and second urging means applying an urging force in offsetting directions.

10. The disk detaching/attaching unit according to claim 6, wherein a changer hand delivers said disk onto said tray.

* * * * *